Feb. 4, 1964     L. REALE     3,120,439
PROCESS FOR THE PRODUCTION OF DRY COFFEE EXTRACT
Filed July 20, 1960     4 Sheets-Sheet 1

INVENTOR
*Lucio Reale*
BY *Michael S. Striker*
*his* ATTORNEY

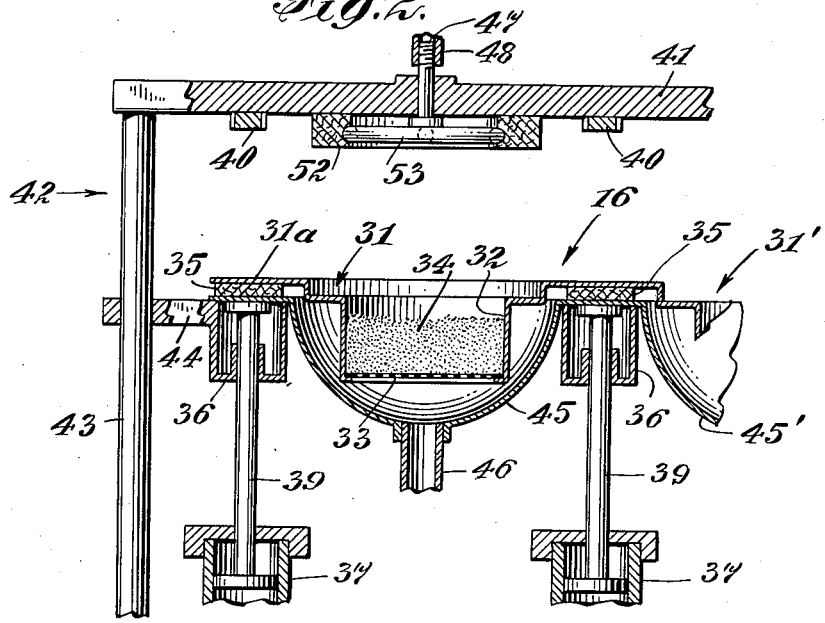
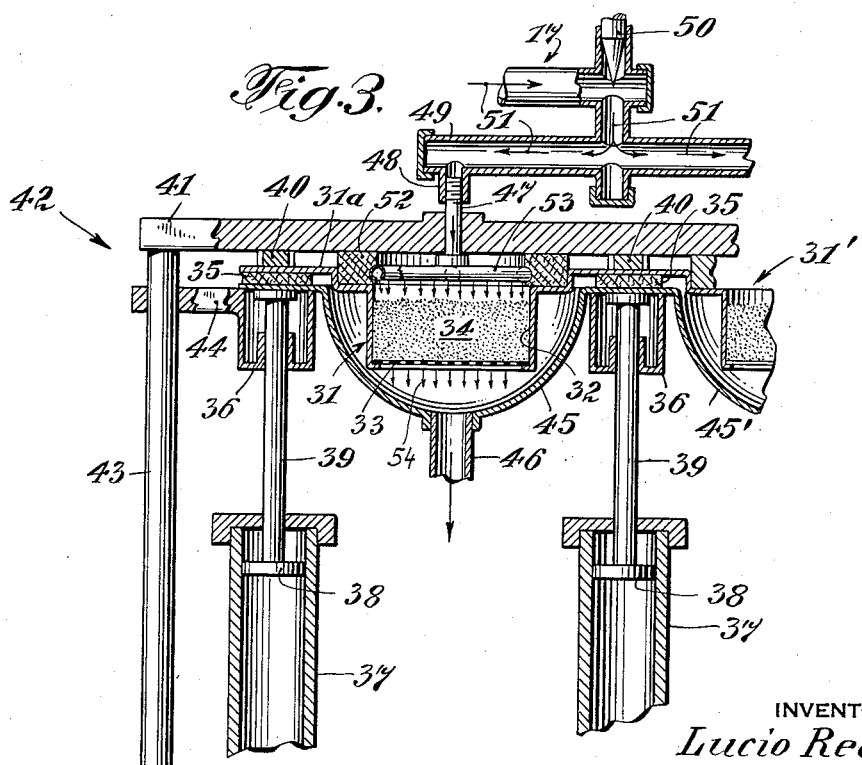

Feb. 4, 1964 L. REALE 3,120,439
PROCESS FOR THE PRODUCTION OF DRY COFFEE EXTRACT
Filed July 20, 1960 4 Sheets-Sheet 3

INVENTOR
Lucio Reale
BY
his ATTORNEY

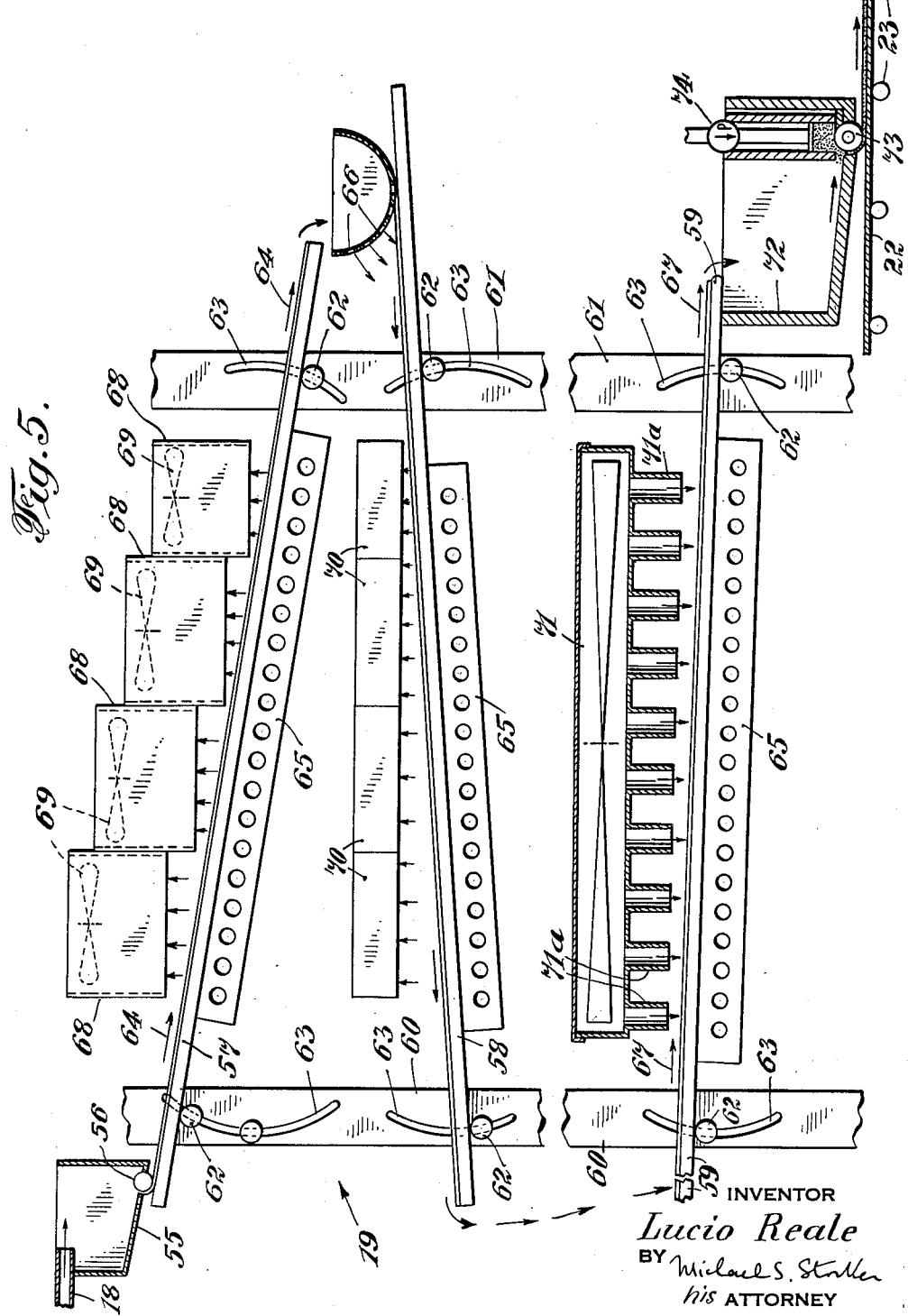

United States Patent Office 3,120,439
Patented Feb. 4, 1964

3,120,439
PROCESS FOR THE PRODUCTION OF
DRY COFFEE EXTRACT
Lucio Reale, Montreal, Quebec, Canada
(1311 Grenade St., Chambly-West, Quebec, Canada)
Filed July 20, 1960, Ser. No. 44,211
1 Claim. (Cl. 99—71)

The present invention relates to a process and to an apparatus for the production of dry coffee extract. The invention also relates to a dry, instantly soluble coffee extract which is enriched with extra flavor.

An object of the invention is to provide a process of preparing an instantly soluble dry coffee extract which may be utilized for instant brewing of coffee beverages or which may be mixed with other forms of coffee to obtain a different and even better tasting instantly soluble dry coffee product.

Another object of the invention is to provide a process of preparing a dry, instantly soluble coffee extract according to which the liquid coffee concentrate—obtained by subjecting a freshly roasted ground coffee to the action of steam and water under requisite pressures—may be advanced by gravity flow between nearly all successive processing stations, and according to which the entire operation may be carried out in a continuous manner from the percolating station and all the way to the packaging station.

A further object of the invention is to provide an improved dry, instantly soluble coffee product whose advantageous characteristics, i.e. flavor and aroma, greatly exceed the characteristics of presently known products sold under the name of instant coffee.

An additional object of my invention is to provide a novel apparatus for the continuous or discontinuous practice of my process.

With the above objects in view, the invention resides in the provision of a process of preparing a dry, instantly soluble coffee extract such as remains after a dehydration of highly concentrated liquid coffee obtained by the espresso method, the process comprising the steps of subjecting a fixed quantity of preferably freshly roasted and ground coffee to the action of compressed steam and overheated water for a period of time sufficient to produce a liquid coffee concentrate, and of thereupon withdrawing nearly all moisture from the liquid concentrate in a novel manner, namely, by first withdrawing up to between about 88 and 92 percent of moisture while the concentrate is permitted to flow by gravity in a controlled manner and is simultaneously heated during the gravity flow, and by thereupon transforming the resulting pasty concentrate into thin layers which are first cooled and thereupon heated to form sheets of dry, instantly soluble coffee extract. This extract is subsequently transformed into pulverulent state to be ready for weighing, packing, storage and/or transport.

The espresso method of producing highly concentrated liquid coffee consists in subjecting predetermined quantities of freshly roasted and ground coffee to the action of controlled amounts of compressed steam which causes a swelling of the comminuted coffee particles by penetrating deeply into each particle so that the subsequently introduced overheated water which is also under pressure can readily extract caffeine, carbohydrates and other soluble substances to form with such soluble substances a suspension in the form of a liquid coffee concentrate. A metered quantity of freshly ground coffee is placed into preferably shallow perforated receptacles to present a large surface to the steam and water, and is preferably tamped prior to actual contact with steam in order to offer a certain resistance to the flow of steam and water therethrough. The concentration of the liquid coffee product obtained by this espresso method is controlled by proper metering of the freshly roasted and ground coffee, and by controlling the quantities of steam and water during the percolating operation. It has been found that a very high concentration of liquid coffee may be obtained when a batch of about 30 g. (say one ounce) of freshly roasted and ground coffee (corresponding to approximately six servings) is subjected to the action of a combined steam and water flow produced in a boiler wherein the combined steam and water is maintained at an internal boiler pressure of about 42 lb./sq. inch, the quantity of steam and water admitted into contact with the ground coffee being such that the espresso machine will eject about 6 fl. oz. of liquid coffee in about 60 seconds, i.e. one fluid ounce per serving.

For the practice of my novel process, I provide an improved percolating apparatus in the form of an expresso machine which is capable of producing large quantities of liquid coffee concentrate such as are necessary for the mass production of dry, instantly soluble coffee extract. This novel percolating apparatus comprises a series of boilers each of which may deliver steam and overheated water to one, two or more percolators, and each percolator is adapted to process comparatively large quantities of freshly roasted and ground coffee, e.g. 1000 g., in a single operation. In one of its preferred forms, the percolating apparatus comprises 10 boilers each of which is adapted to deliver steam and water to two percolators and each of which has a capacity of 50 gals. The water is heated up to a temperature of 300° F. with an internal boiler pressure of between about 40 and 70 lb./sq. in., and preferably at a pressure of about 70 lb./sq. in. which latter pressure represents nearly the saturation point of overheated steam. Steam and overheated water are discharged into contact with the aforementioned quantity of freshly roasted and ground coffee by passing through a suitable spray nozzle so as to be uniformly distributed in all zones of the ground coffee and to insure complete dissolution of all soluble matter. The flow of steam and water is regulated by suitable valve means in such manner that the percolator will produce $158\%_{28}$ gals. of espresso coffee, i.e., a highly concentrated liquid coffee, within a two-minute period.

In the next step, the liquid concentrate is introduced into an evaporating machine of novel design where it is permitted to flow by gravity along the upper surfaces of one, two or several superimposed oppositely inclined platforms and is simultaneously subjected to controlled heating action so as to lose between about 88 and 92 percent of its moisture and to be transformed into a rather thickly flowing paste. An important advantage of such dehydration by heating during gravity flow is that the liquid concentrate maintains its aroma and flavor for which the espresso coffee is known throughout the world. The initial dehydration is completed much faster than in presently known evaporators and without any boiling of the liquid concentrate. The temperature of inclined platforms in the improved evaporator is controlled in dependency on the amounts of liquid concentrate flowing therealong per unit of time, on the inclination of the platforms, on the area of the platforms, and certain other factors. For example, the temperatures prevailing in the evaporating apparatus may be in the range of between about 150 and 250° F.

As the liquid concentrate progressively loses its moisture, it becomes thicker and the velocity of its flow decreases. Consequently, at a certain stage of the evaporating operation, it would begin to stick to the inclined surfaces of the platforms and would start to bubble under the action of heat. Of course, any adherence of thickened paste like concentrate to the platforms would impede continuous production of instantly soluble coffee extract and would bring about a reduction in quality of the final product particularly since valuable matter would be freed to escape if the temperature of the concentrate would be permitted to exceed a predetermined upper limit. In accordance with an important feature of my invention, the initial dehydration or evaporation by gravity flow along the surfaces of inclined heated platforms is terminated when the moisture contents of the liquid concentrate drop to between about 8–12 percent, whereupon the concentrate is transformed into thin layers with a thickness of preferably about 0.5 mm. and is simultaneously subjected to a cooling action at temperatures of about 40° F. which results in almost immediate solidification of layers to form thin sheets of instantly soluble dry coffee product. Such cooling action may be brought about by distributing the thickened paste-like concentrate (with moisture contents of between about 8–12 percent) onto the surfaces of cooled plates maintained at a temperature of about 40° F. The cooled plates with the layers of solidified but still rather wet concentrate are thereupon advanced into a heating chamber where the concentrate is subjected to a second dehydrating action at a temperature of between about 140–180° F. to further reduce its moisture contents so that the final product, still supported by the plates, contains at most 4 percent and preferably not less than 1 percent of moisture. Thus, the evaporating apparatus and the initially cooled and thereupon heated plates bring about a 99-percent dehydration of liquid espresso coffee in such a manner that the resulting coffee extract maintains its aroma and flavor because it never reaches the boiling point during the entire two-stage dehydrating operation. In addition, the two-stage dehydration (in the evaporating apparatus, and on the initially cooled and subsequently heated plates) renders it possible to process the liquid concentrate in a continuous operation because the evaporating apparatus is free to run continuously and the plates may be advanced at such speed as to continuously take up all of the pasty concentrate which reaches the discharge end of the evaporating apparatus.

It has been found that, if volatiles given off by coffee during the roasting process are introduced into the liquid coffee concentrate, and particularly if such volatiles are introduced into the concentrate at that stage of the evaporating operation when the concentrate is already transformed into a paste containing only between about 8–12 percent moisture, the aromatic molecules will be retained in the final product and will contribute to higher quality of the instantly soluble dry coffee extract. In other words, it is preferred to introduce volatiles given off in the roasting process to the pasty concentrate flowing along the lowermost platform of the evaporating apparatus just before the pasty substance leaves the evaporator.

The solid coffee sheets adhering to the plates leaving the heating chamber, which by now contain only up to about 4 percent of moisture, are thereupon broken away by suitable scraping devices and the fragments are introduced into a suitable grinder which transforms such fragments into pulverulent state, the pulverulent coffee extract being then ready for packaging, weighing, shipment and storage. The resulting finely comminuted dry coffee extract is the pure conversion product of the liquid espresso coffee and possesses all advantageous characteristics of espresso coffee. It is of dark brown or nearly black color when dissolved in hot water, and the solution has a delicious taste and aroma. Also since the pulverulent extract is a pure concentrate of coffee, it need not be utilized in such quantities (3–5 g.) as presently known instant coffees to produce a single serving of liquid coffee.

In bars, restaurants and like establishments, the weight of one serving of espresso coffee is about 1 fl. oz. of liquid concentrate; therefore, only such quantities of my improved powdered extract must be used for one serving as are necessary to produce one fluid ounce of highly concentrated liquid coffee. Too much extract will give the beverage a bitter taste; on the other hand, too much water or too little extract will also change the desirable true espresso characteristics of the beverage. I have found that each 5 g. of freshly ground coffee (which is less than is necessary for one serving of conventionally brewed regular coffee) can be transformed into 1 g. of dry, pulverulent instantly soluble coffee extract, and that 1 g. of extract when mixed with 1 fl. oz. of water will produce a serving of genuine espresso coffee. The extract may be packed into envelopes or other containers each containing 1 g. (one serving), 2 g. (twin serving), or more if the packaged product is intended for use in commercial establishments. I have also found that the operation of the espresso machine is particularly satisfactory if it comprises a series of pairwise arranged percolators each of which may receive 1000 g. of roasted and ground coffee so that a twin percolator will simultaneously process 2000 g. of ground coffee into a corresponding quantity of liquid coffee concentrate known as espresso coffee. When operated on a commercial scale, the apparatus of my invention may be assembled to produce 2000 g. of instantly soluble dry coffee extract every two minutes which corresponds to an output of 480 kg. for each eight-hour shift.

I will now describe a modification of my improved process which provides a different brand of coffee product with a taste considered by many as even superior to the taste of the above described coffee extract. As is known, freshly ground coffee in quantities necessary for a single serving of infusion brewed coffee, i.e. of the regular coffee beverage which is obtained by subjecting ground coffee beans to the action of boiling water, has never been marketed because comparatively large quantites of freshly ground coffee are necessary for each serving. To produce a single cup of regular coffee, 7–8 grams of ground coffee may be required, i.e. a rather large volume of ground coffee, which is due to the fact that mere contact with boiling water will not extract from the coffee all of its aroma, flavor and color. In contrast to this, and as mentioned above, a serving of good espresso coffee requires only about 5 g. of freshly ground coffee because the action of steam and overheated water under high pressure is much more effective and results in the extraction of more solubles than under the action of boiling water alone.

In accordance with a further feature of my invention, predetermined quantities of roasted and ground coffee and corresponding quantities of my instantly soluble dry coffee extract may be mixed and stored in airtight bags containing such quantities of the mixture as are necessary for one, two or more servings of liquid coffee beverage. The advantage of such mixture is that, upon contact with boiling water, the extract will immediately enter into a suspension with water giving the water a desirable color, aroma and flavor, while the roasted and ground coffee complements the characteristics of the suspension by giving it additional genuine coffee aroma and flavor and by increasing the concentration of the liquid coffee. Good results may be obtained when about 50–75 percent of roasted and freshly ground coffee are mixed with between about 25–50 percent of instantly soluble dry coffee extract. For example, a very satisfactory mixture sufficient for one serving of liquid coffee contains about 0.5 g. dry coffee extract and about 1.5 g. roated ground coffee. Analogously, a mixture for a twin serving will consist of 1 g. coffee extract and 3 g. ground coffee. In other words, a very satisfactory ratio of dry coffee extract to ground coffee is about 1:3; this ratio may be changed up to 1:1 if it is desired to produce a very strong beverage.

The novel features which are considered as characteristic for the invention are set forth in particular in the appended claim. The invention itself, however, both as to its construction and its method of operation, together with additional objects and advantages thereof, will be best understood from the following detailed description of a specific embodiment when read in connection with the accompanying drawings, in which:

FIG. 2 is a fragmentary sectional view of a twin percolator in open position at the start of a percolating step;

FIG. 3 is a similar sectional view of the percolator in operative position;

FIG. 5 is a schematic side elevational view of the evaporating apparatus.

Figure 1:
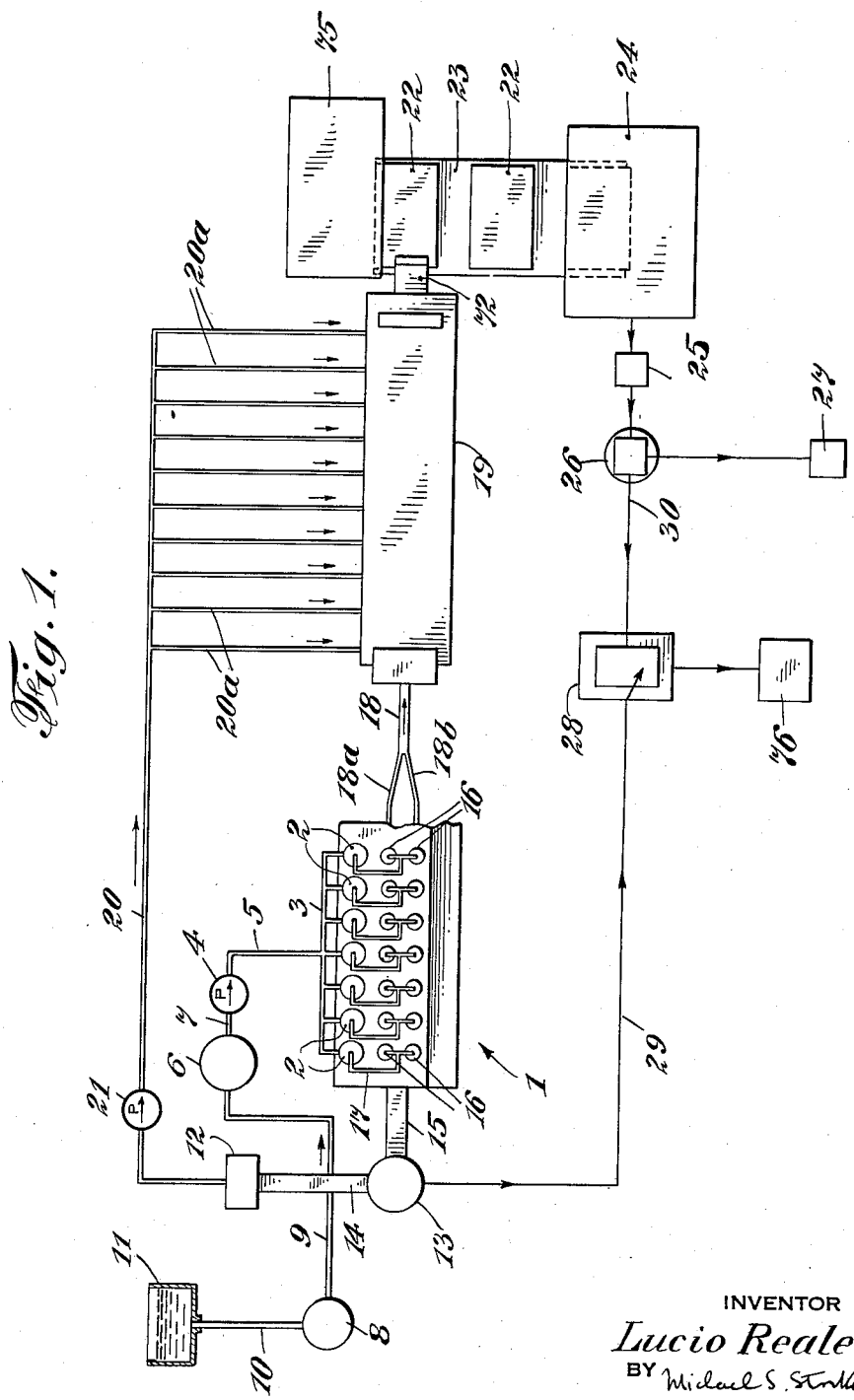
FIG. 1 is a flow sheet showing the various processing stations in somewhat diagrammatic form.

Referring now in greater detail to the drawings, and first to FIG. 1, there is shown an apparatus for the production of dry, instantly soluble coffee extract which comprises a percolating station in the form of an espresso machine 1 including a series of aligned boilers 2 which receive water, preferably in preheated form, from a header 3, the latter connected to the pressure side of a pump 4 by a conduit 5. The suction side of the pump 4 communicates with a larger boiler 6 through a conduit 7, and the boiler 6 communicates with a water filter 8 through a conduit 9. A further conduit 10 connects the filter 8 with a suitable water source here shown as a reservoir 11.

The apparatus also comprises a coffee roasting machine 12 which delivers roasted coffee beans to a grinding machine 13 in any suitable manner, e.g. through a chute 14 or the like, and a suitable conveyor system 15 delivers a certain amount of freshly roasted and ground coffee from the grinder 13 to each of pairwise arranged percolators 16 forming part of the percolating apparatus 1. Each pair of percolators 16 is connected with one of the boilers 2 through a header 17, and the highly concentrated liquid coffee produced in the percolators 16 is collected by the branches 18a, 18b of a concentrate discharge pipe 18 which conveys the liquid concentrate to an evaporating apparatus 19. This evaporating apparatus communicates with a series of conduits 20a branching off from a gas discharge pipe 20 which is connected to the roaster 12. A pump 21, inserted in the pipe 20, causes volatiles given off in the roasting process to flow through the branch conduits 20a and into the evaporating apparatus 19. The evaporating apparatus 19 withdraws between about 88 and 92 percent of moisture from the liquid concentrate in a manner to be fully described in connection with FIG. 5, and the resulting pasty substance discharged from the apparatus 19 is distributed onto the surfaces of cooled plates 22, the latter mounted for travel along the upper run of a suitable conveyor 23. This conveyor delivers the plates 22 into a heater 24 where the paste-like substance loses the major part of its moisture and forms a comparatively hard, dry crust on each of the plates 22. This crust is removed by a suitable scraper 25 which is located in advance of a grinding device 26, the purpose of this grinding device being to transform the solid fragments scraped off the plates 22 into a fine powder constituting a dry, instantly soluble coffee extract which is thereupon conveyed to a weighing and packaging station 27.

In accordance with an important feature of my invention, a certain percentage of, or the entire pulverulent extract obtained in the grinder 26 may be diverted to a mixing device 28 which also receives freshly roasted and ground coffee from the grinder 13, the direction of advance of freshly ground coffee and of pulverulent dry extract to the mixing device 28 being indicated by the lines 29, 30, respectively.

Figure 4:
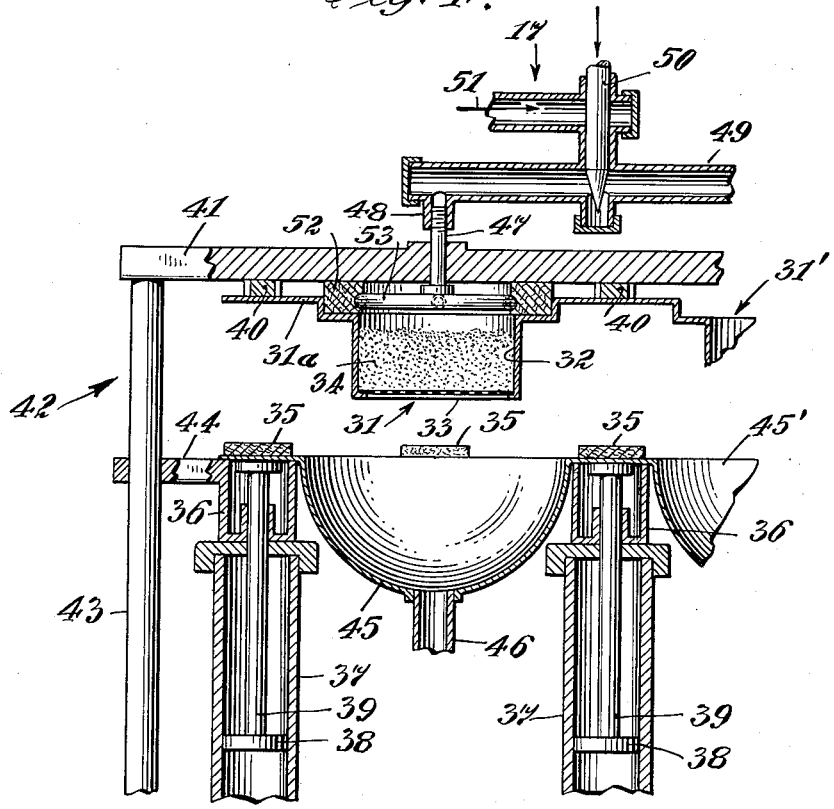
FIG. 4 is a similar sectional view of the percolator after the completion of a percolating step.

A portion of the percolating apparatus 1 is shown in greater detail in FIGS. 2 to 4. This apparatus actually constitutes an espresso machine in which a certain quantity of roasted and freshly ground coffee is subjected to the action of compressed steam and overheated water to produce a liquid concentrate which is thereupon collected in the branch conduits 18a and 18b.

As is shown in FIG. 2, each percolator 16 comprises a suitably configurated receptacle 31, made of sheet metal or the like, which is formed with a rounded or polygonal recess 32 and with a perforated bottom or sieve 33. The receptacle 31 receives a predetermined quantity of freshly roasted and ground coffee 34 which at least partially fills the recess 32 and is located above the sieve 33. The flange 31a of the receptacle 31 rests on a plurality of resilient cushions 35 supported at the top of a carriage 36 which latter, in turn, is loosely supported at the upper ends of several fluid cylinders 37. Each of cylinders 37 reciprocably receives a piston 38 (shown in FIGS. 3 and 4) whose piston rods 39 are secured to the carriage 36 so that, when the pistons 38 are caused to move in upward directions, the carriage 36 will lift the receptacle 31 from the position of FIG. 2 into the position of FIG. 3 in which the flange 31a of the receptacle 31 abuts against two or more permanent magnets or electromagnets 40, the latter supported at the underside of a plate 41 which forms part of a frame 42. This frame comprises an upright member 43 slidably supporting an arm 44 which holds the carriage 36 and participates in the movements of this carriage toward and away from the magnets 40.

The receptacle 31 constitutes one-half of a twin receptacle whose other half 31' is mounted in similar fashion on the non-illustrated portion of the carriage 36. Also, the arrangement partly shown in FIGS. 2–4 normally comprises a second arm, similar to the arm 44, which is reciprocable along a second upright, similar to the upright 43, so that the two receptacles 31, 31' of a pair of aligned percolators 16 are simultaneously movable toward and away from the top plate 41.

Before the receptacles 31, 31' are lifted into engagement with the magnets 40, the metered quantity of ground coffee 34 in the recesses 32 of these receptacles is preferably tamped with the help of a suitable tamping device, not shown in the drawings.

The carriage 36 supports two cupped collecting containers 45, 45' which receive the liquid concentrate passing through the sieves 33 at the bottom of the receptacles 31, 31' when the ground coffee in these receptacles is subjected to the action of steam and water in the manner to be presently described. The bottom zone of each collecting container 45, 45' communicates with a line 46 leading to one of the branch conduits 18a, 18b.

Referring now to FIG. 3, the plate 41 is traversed by a series of upwardly extending supply pipes 47, one for each receptacle 31, 31', and each pipe 47 is connected to one outlet 48 of a distributor pipe 49 forming part of the respective header 17. The flow of water and steam into the distributor pipe 49 is controlled by a suitable valve 50, e.g. a needle valve. The direction of water and steam flow is indicated by the arrows 51. In the position of FIG. 3, a median portion of the receptacle 31 is in sealing contact with a resilient packing 52 which surrounds the discharge end of the supply pipe 47 and thus prevents the escape of water and/or steam when the valve 50 is in the open position of FIG. 3. Such sealing contact between the packing 52 and the receptacle 31 is established and maintained by the fluid operated piston-cylinder assemblies 37, 38 which also urge the flange 31a of the receptacle 31 into engagement with the magnets 40. The discharge end of the supply pipe 47 communicates with and supports an annular or otherwise shaped spray nozzle 53 which is located above the exposed upper side of the freshly ground tamped coffee 34 in the receptacle 31 so that, when the valve 50 is in open position, an operator will introduce highly compressed steam from the respective boiler 2, the steam flowing through the respective header 17, through the respective distributor pipe 49, through the supply pipe 47 and through the spray nozzle 53 to penetrate the batch of coffee 34. The steam will cause the particles of ground coffee to swell and will facilitate the action of overheated water which is introduced in the next step in order to extract from the coffee batch 34 all soluble matter and to be transformed into highly concentrated liquid espresso coffee which passes through the sieve 33 (arrows 54) into the collecting container or cup 45, through the line 46, and into the branch conduit 18a or 18b to enter the discharge pipe 18 on its way to the evaporating apparatus 19.

FIG. 4 illustrates the percolator 16 in a position it assumes when the production of a given quantity of liquid coffee concentrate is completed. The fluid operated piston-cylinder assemblies 37, 38 cause the arm 44 and the carrier 36 to descend but the magnets 40 retain the twin receptacle 31, 31' with the exhausted coffee batch 34e so that an operator may readily remove this twin receptacle to replace it by a similar one which contains a new supply of freshly ground coffee, whereupon the operation is repeated in the same way. It will be understood that, in replacing the receptacle 31, 31' by a new one, the new receptacle is placed onto the cushions 35 of the lowered carrier 36. This arrangement renders it possible to operate the percolator 16 in a semiautomatic manner, i.e. to reduce the intervals between the production of successive quantities of liquid coffee concentrate in each of the percolators 16. It is also possible to provide on the upright 43 a second arm, similar to the arm 44, and a second carrier, similar to the carrier 36, and to mount the second arm for swinging movements about the upright 43 so that this second arm and the second carrier may receive the receptacle 31 of FIG. 4 and will support it during the removal of exhausted ground coffee batch 34e as well as during the loading and tamping of a new supply of freshly roasted coffee. Whether or not the entire percolating operation will be fully automatic depends on the desired output of the machine, i.e. if desired, the steps of loading freshly ground coffee, lifting the carriage 36 into the position of FIG. 3, introducing steam and water into the tamped coffee batch 34, returning the carriage 36 into the position of FIG. 4, and replacing the spent coffee batch 34e by a new one may be carried out in a fully automatic way without requiring any attention from the operator. The means for bringing about such automatic operation of all component parts in a predetermined sequence are well known in the art and, therefore, such construction is not shown in the drawings. Even the loading of freshly ground coffee delivered by the conveyor 15 and the tamping of metered quantities of coffee in each of the receptacles 31, 31' may be carried out in a fully automatic way.

FIG. 5 shows the evaporating apparatus 19. The discharge pipe 18 delivers liquid coffee concentrate into a pan 55 where the oil floating on the surface is removed in any suitable manner, not shown. A discharge opening controlled by a roller 56 permits the concentrate, now free of oil, to flow by gravity along the inclined bottom of the pan 55 and onto the surface of a first inclined evaporating platform 57. The slope of this platform 57, as well as of the inclined platforms 58, 59 therebelow, may be changed in the following manner:

The supporting frame of the evaporating apparatus 19 comprises spaced uprights or posts 60, 61 each of which is formed with arcuate slots 63 for the reception of headed supporting pins 62. By proper adjustment of the pins 62 in their respective slots 63, the inclination of the evaporating platforms 57, 58, 59 may be varied as desired so as to insure a satisfactory gravity flow of liquid coffee concentrate from the upper left-hand end of the platform 57 in the direction of the arrows 64. It will be noted that the superimposed platforms 57, 58 59 are inclined in opposite directions, i.e. the platform 58 is inclined to the left and the platforms 57, 59 to the right. Beneath each platform, there is provided a suitable heating unit 65, these heating units preferably consisting of electric resistance heating elements or the like and their purpose being to bring about rapid evaporation of moisture from the liquid concentrate flowing by gravity along the surfaces of platforms 57, 58 and 59 in that order. The concentrate reaching the lower right-hand end of the platform 57 enters into and is deflected by a suitable tray shaped deflecting and screening means 66 to flow by gravity along the second platform 58 and to lose additional moisture as it passes toward the lower left-hand end of the platform 58 where it may be deflected or may simply overflow onto the third evaporating platform 59 to continue its gravity flow in the direction of the arrows 67. It will be readily understood that the evaporating apparatus 19 may comprise a larger number of platforms, depending on the output of the espresso machine 1 and on the length and effective area of these platforms, so that the pasty concentrate reaching the lower right-hand end of the lowermost platform 59 will contain only about 8–12 percent of moisture, i.e. the heating elements 65 will cause the liquid concentrate discharged by the pan 55 to lose about 90 percent of its moisture during the gravity flow along the platforms of the evaporating apparatus 19. The vapors ascending from the uppermost platform 57 will accumulate in inverted box-shaped collecting containers 68 each of which may comprise an exhaust fan 69, and the moisture collected in these containers 68 is then led away to waste. The moisture evaporated from the coffee concentrate flowing along the second platform 58 is collected by containers 70.

Above the lowermost platform 59, there is provided a header 71 which communicates with the branch conduits 20a and is formed with a series of discharge nozzles 71a which direct the aromatic gases given off by fresh coffee treated in the roaster 12 onto the exposed surface of the pasty concentrate flowing along the platform 59. The slowly flowing pasty concentrate reaching the right-hand end of the platform 59 is precipitated into a tank 72 where the moisture contents are determined in any suitable way, e.g. by a densometer or the like, not shown. The inclined bottom of the tank 72 is formed with a discharge opening which is controlled by a roller 73, and the tank supports a pump 74 which forces the pasty concentrate about the roller 73 and onto a cooled plate 22 which, as also shown in FIG. 1, is mounted on the rolls of a conveyor 23. Referring back to FIG. 1, it will be seen that the conveyor 23 advances the plates 22 through a cooling chamber 75 so that the plates are cooled before they reach the tank or vat 72. It is preferred to apply the pasty concentrate in the form of rather thin layers e.g. each plate 22 may receive a layer with a thickness of about 0.5 mm. so that heat in the heating chamber 24 will rapidly remove a requisite amount of moisture whereby the solid extract reaching the scraper 25 will contain no more than about 4 percent and usually not less than about 1 percent of liquid matter. The cooling chamber 75 reduces the temperature of the plates 22 to about 40° F. before the plates reach the tank 72.

At the weighing and packaging station 27, the pulverulent extract is packed in suitable envelopes or other receptacles containing, for example, 1 g. for a single serving, 2 g. for a double serving, and so forth. The individual envelopes are then placed into boxes for shipping, storage and marketing. For use in restaurants, cafeterias, lunchrooms and other establishments which utilize large quantities of coffee products, the powdered extract may be placed into larger containers in the form of packages sufficient for say eight, ten or more servings each.

The mixing station 28 delivers a mixture of dry extract and freshly roasted ground coffee to a second packaging and weighing station 76 where the mixture is weighted and placed into suitable infusion bags or other receptacles.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claim.

What is claimed as new and desired to be secured by Letters Patent is:

A process of preparing a dry, pulverulent, water soluble coffee extract which comprises forming a liquid coffee extract by an espresso method including subjecting roasted ground coffee to the action of steam at pressures of between about 40 and 70 lb. sq. in. to cause a swelling of the ground coffee particles and thereupon subjecting the swelled particles to the solubles extracting action of overheated water at temperatures in the range of about 300° F.; subjecting the liquid extract to a first dehydrating action to reduce its moisture content to between about 8 and 12 percent and to transform the liquid concentrate into a pasty substance by advancing the extract by gravity flow along inclined planes and simultaneously heating the extract to a temperature of between about 150 and 250° F. to permit evaporation of the moisture contents thereof; subjecting the pasty substance to a second dehydrating action to reduce its moisture content to between about 1 and 4 percent by distributing the pasty substance in the form of layers having a thickness at about 0.5 mm. and cooling said layers to about 40° F. while they are being formed and thereupon heating the layers to a temperature of between about 140 and 180° F.; and grinding the dried layers into pulverulent form.

References Cited in the file of this patent

UNITED STATES PATENTS

| | | |
|---|---|---|
| 40,662 | Miller | Nov. 17, 1863 |
| 526,228 | Hewitt | Sept. 18, 1894 |
| 634,349 | Humphrey | Oct. 3, 1899 |
| 913,760 | Osborne | Mar. 2, 1909 |
| 1,010,721 | Brown | Dec. 5, 1911 |
| 1,367,725 | Trigg | Feb. 8, 1921 |
| 1,744,884 | Greiner | Jan. 28, 1930 |
| 2,504,735 | Schwartz et al. | Apr. 18, 1950 |
| 2,688,911 | Hochmayr | Sept. 14, 1954 |
| 2,750,871 | Landgrabber et al. | June 19, 1956 |
| 2,758,927 | Chase | Aug. 14, 1956 |
| 2,925,027 | Salati | Feb. 16, 1960 |